US005485154A

United States Patent [19]
Brooks et al.

[11] Patent Number: 5,485,154
[45] Date of Patent: * Jan. 16, 1996

[54] COMMUNICATION DEVICE AND METHOD(S)

[75] Inventors: David R. Brooks; Graham A. Murdoch, both of Perth, Australia

[73] Assignee: Magellan Corporation (Australia) Pty. Ltd., Canning Vale, Australia

[*] Notice: The portion of the term of this patent subsequent to Apr. 12, 2011, has been disclaimed.

[21] Appl. No.: 183,118

[22] Filed: Jan. 18, 1994

Related U.S. Application Data

[63] Continuation-in-part of Ser. No. 978,033, Nov. 18, 1992, Pat. No. 5,302,954.

[30] Foreign Application Priority Data

Dec. 4, 1987 [AU] Australia .................................. PI 5744

[51] Int. Cl.⁶ .................................................. G01S 13/80
[52] U.S. Cl. .................... 342/44; 342/50; 342/51
[58] Field of Search .................... 342/42, 44, 50, 342/51

[56] References Cited

U.S. PATENT DOCUMENTS

| | | | |
|---|---|---|---|
| 3,611,379 | 10/1971 | Deckett | 342/125 |
| 3,689,885 | 9/1972 | Kaplan | 342/42 |
| 3,701,150 | 10/1972 | Dame | 342/42 |
| 3,737,911 | 6/1973 | Sakuragi | 342/44 |
| 3,750,168 | 7/1973 | Schrader | 342/30 |
| 3,878,528 | 4/1975 | Majeau | 342/44 |
| 3,886,548 | 5/1975 | Majeau | 342/44 |
| 3,887,916 | 6/1975 | Goyer | 342/30 |
| 3,911,434 | 10/1975 | Cook | 342/50 |
| 3,945,006 | 3/1976 | Cleeton | 342/45 |
| 3,964,024 | 6/1976 | Hutton | 342/44 |
| 4,006,477 | 2/1977 | Yost, Jr. | 342/51 |
| 4,023,167 | 5/1977 | Wahlstrom | 342/42 |
| 4,034,371 | 7/1977 | Maier | 342/43 |
| 4,095,226 | 6/1978 | Kratzer | 342/393 |
| 4,114,151 | 9/1978 | Denne | 342/44 |
| 4,144,534 | 3/1979 | Prickett | 342/43 |
| 4,206,462 | 6/1980 | Rabow | 342/60 |
| 4,209,783 | 6/1980 | Ohyama | 340/825 |
| 4,297,700 | 10/1981 | Nard | 342/125 |
| 4,350,982 | 9/1982 | Alpers | 342/42 |
| 4,364,043 | 12/1982 | Cole | 342/44 |
| 4,388,524 | 6/1983 | Walton | 342/44 |
| 4,510,495 | 4/1985 | Sigrimis | 342/44 |
| 4,551,712 | 11/1985 | Fockens | 342/42 |
| 4,554,668 | 11/1985 | Deman | 375/1 |
| 4,558,453 | 12/1985 | Mimken | 375/1 |
| 4,606,041 | 8/1986 | Kadin | 375/1 |
| 4,612,652 | 9/1986 | Kadin | 375/1 |
| 4,694,466 | 9/1987 | Kadin | 375/1 |
| 4,725,841 | 2/1988 | Nysen | 342/44 |
| 4,786,903 | 11/1988 | Grindahl | 340/825.54 |
| 4,829,540 | 5/1989 | Waggener | 375/1 |
| 4,850,036 | 7/1989 | Smith | 455/179 |
| 4,862,176 | 8/1989 | Voles | 342/45 |
| 4,931,788 | 6/1990 | Creswick | 340/825.54 |
| 4,963,887 | 10/1990 | Kawashima | 342/44 |
| 5,029,182 | 7/1991 | Cai | 375/1 |
| 5,043,903 | 8/1991 | Constant | 364/460 |
| 5,051,741 | 9/1991 | Wesby | 340/825.49 |
| 5,302,954 | 4/1994 | Brooks et al. | 342/44 |

FOREIGN PATENT DOCUMENTS

| | | |
|---|---|---|
| 34109 | 10/1984 | Australia . |
| 70052 | 3/1987 | Australia . |
| 587313 | 8/1989 | Australia . |
| 0006691 | 1/1980 | European Pat. Off. . |
| 2554293 | 10/1984 | France . |
| WO89/005549 | 6/1989 | WIPO . |

*Primary Examiner*—J. Woodrow Eldred
*Attorney, Agent, or Firm*—Baker & Daniels

[57] ABSTRACT

The present invention relates to the areas of communication and/or identification of remote devices (active or passive). The invention has application where there is a need to identify or communicate with more than one remote device. The remote device may be embodied as a transmitter arrangement, transducer, transponder or responder. In particular, the present invention calls for each remote device to include a transmitter means in which, at each transmission, a carrier frequency or medium is newly selected.

34 Claims, 14 Drawing Sheets

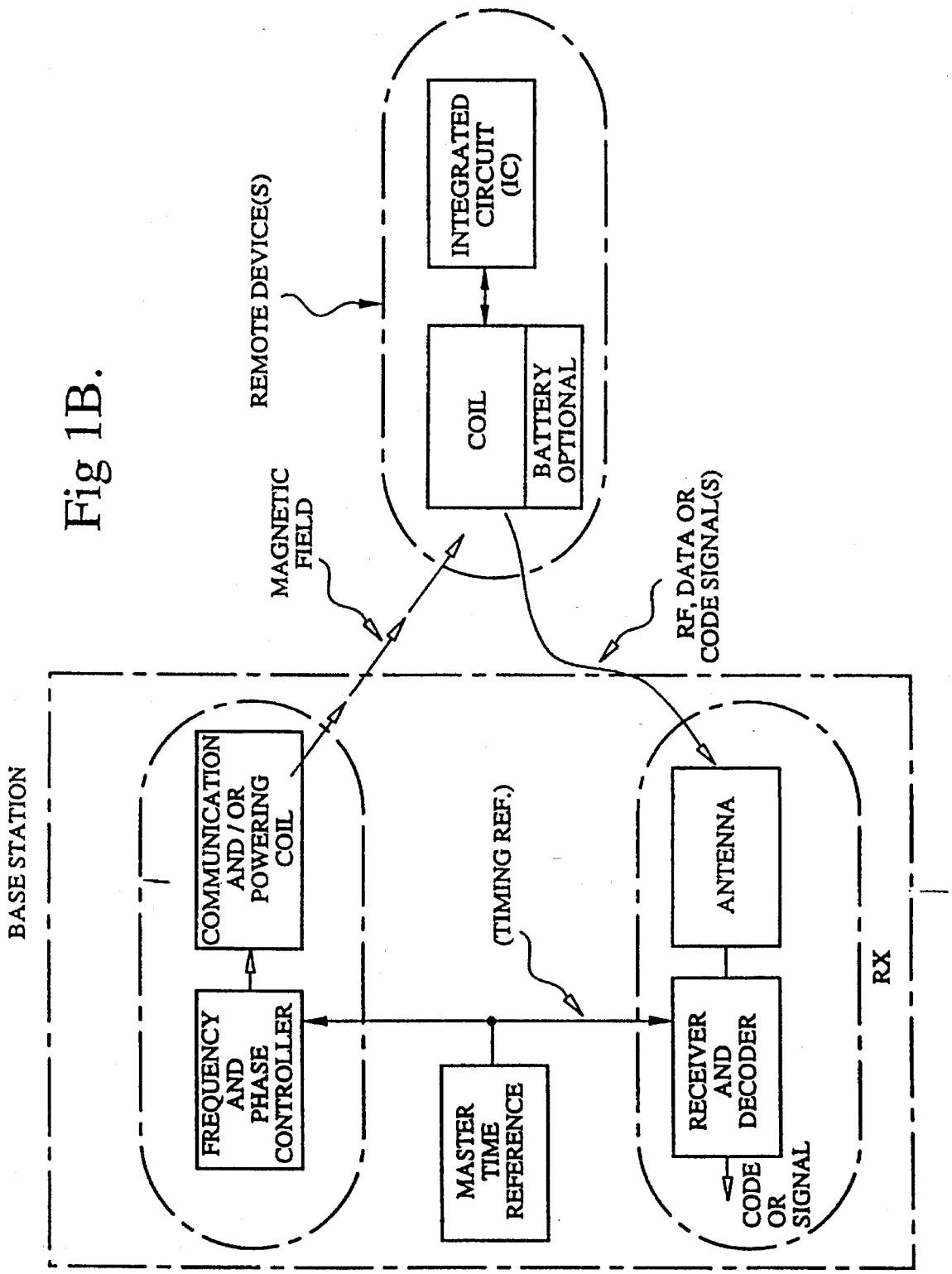

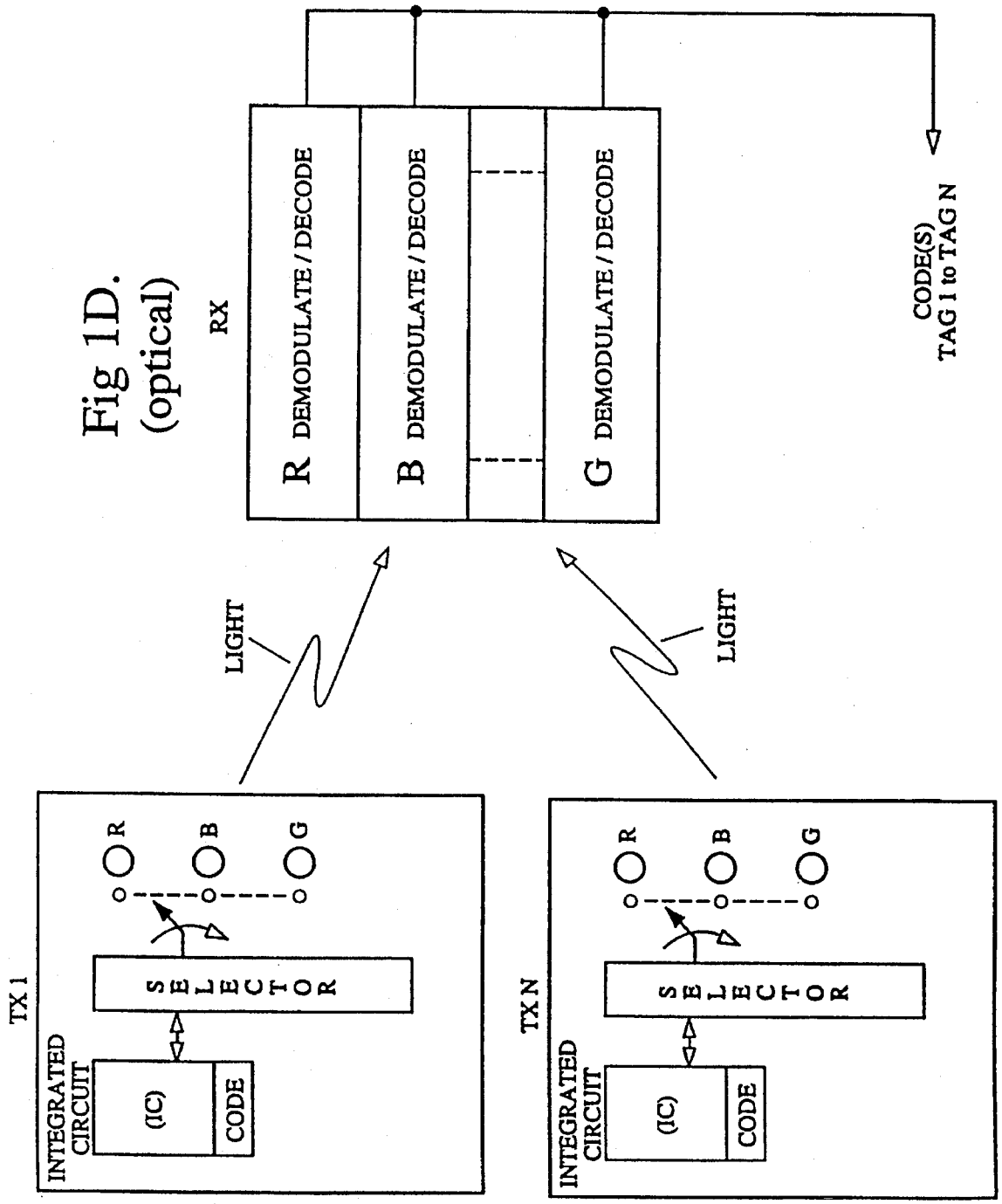

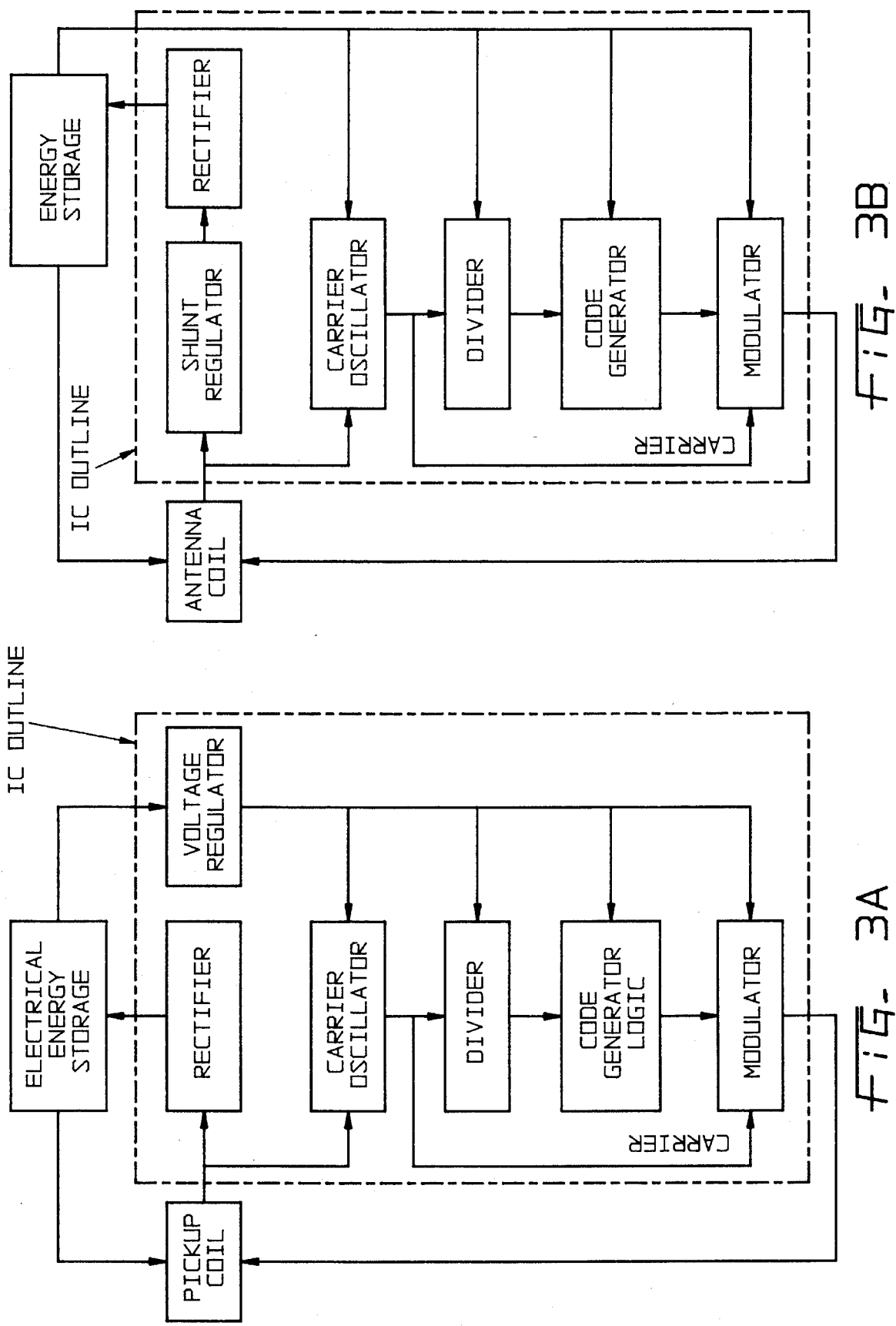

COMMUNICATION DEVICE AND METHOD(S)

CROSS REFERENCE TO RELATED APPLICATION

This is a continuation-in-part of application Ser. No. 07/978,033, filed Nov. 18, 1992, now U.S. Pat. No. 5,302,954.

FIELD OF INVENTION

The present application relates to the areas of communication and/or identification of remote devices (active or passive).

A specific application of the present invention is in the identification of airline baggage, where relatively large volumes of baggage need to be identified and routed to a specific destination. The invention, however, has general application in situations where there is a need to identify or communicate with one or more remote devices by way of interrogation. The invention, further lends itself to consolidation of more than one remote device. A remote device may be embodied as a transmitter configuration, transducer, transponder or responder.

BACKGROUND ART

A number of background art identification or communication systems exist, but all have various limitations in use where more than one remote device is to be identified, particularly where such identification or communication is to occur with more than one device within a relatively short space of time or substantially simultaneously.

In some prior art systems, such as Voles (U.S. Pat. No. 4,862,176), Nard (U.S. Pat. No. 4,297,700), Kratzer (U.S. Pat. No. 4,095,226), Maier (U.S. Pat. No. 4,034,371) a single frequency is used for both transmission and reception of coded signals. Thus, if two devices communicate together, there will be interference.

In some other prior art, such as Alpers (U.S. Pat. No. 4,350,982), an interrogation pulse of known frequency is intercepted by the transponder, delayed and rebroadcast. The carrier frequency of the rebroadcast is the same as the original interrogation. Thus, it is not desirable to use a system for two or more remote devices at the same time.

In still another system, Rabow (U.S. Pat. No. 4,206,462), Schrader (U.S. Pat. No. 3,750,168) uses a single frequency interrogating signal. A correlation sequence is detected by the transponder and rebroadcast at a different single frequency in which a sub carrier is superimposed on the interrogating signal for synchronism between interrogator and remote device. Such systems are undesirable where synchronism is not available or difficult to achieve and particularly where more than one remote device is to be communicated or identified at the one time.

Other systems, such as Goyer (U.S. Pat. No. 3,887,916), Yost (U.S. Pat. No. 4,006,477), Cleeton (U.S. Pat. No. 3,945,006) utilize frequency-shift keying and transmit by selecting one of two carrier frequencies when the correlation code is 0 or 1. All transponders of this system use the same frequency translated two carrier frequencies. The frequency transmitted by the transponder is controlled by the interrogator and relies on the interrogator having precise knowledge of the signal being transmitted. Again, such a system is not desirable where a number of remote devices of unknown identify or origin are to be identified or communicated with.

Thus, in summary, in the prior art noted above, the frequency used for communication between interrogator and remote device is always known and/or controlled by the interrogator. Such systems do not enable communication or identification with relatively unknown nor a relative large number of remote devices, nor in a substantially simultaneous manner, nor without substantial interference from other transmitting remote devices.

There is a long felt need in many industries, such as the communication, smart card and airline industries, to provide a means whereby two or more transmitters can be interrogated at the same time and where such interrogation leads to identification of and/or communication with each remote device.

OBJECT OF THE INVENTION

An object of the present invention is to provide a system wherein a plurality of devices may be simultaneously communicated with and/or identified.

A further object of the present invention is to provide a system which may be specifically designed to identify devices within an acceptable failure rate criterion.

A further object of the present invention is to provide a system having minimal co-interference and wherein a plurality of devices may be correctly identified by a single receiver even if the devices are in close proximity.

Another object of the present invention is to provide a system adapted to identify many different objects such as personnel, livestock, baggage, packages, cargo, stolen goods, vehicles, trains, wagons, shipping containers, security cards and may be used in environments requiring identifying or interrogating capabilities, such as inventory control computer security and/or consolidation of a number of remote devices.

Another object of the present invention is to provide a system wherein any one or all remote device(s) and/or transponder(s) therein can be interrogated or altered in response to a radiated magnetic field.

Another object of the present invention is to provide a system comprising disposable and cheap transponders or labels.

SUMMARY OF INVENTION

The present invention provides a transmitter arrangement, adapted to provide communication and/or identification, said arrangement comprising:

transmitter means adapted to transmit a communication signal via a carrier signal frequency selected from a set of possible carrier signal frequencies, selection means for selecting the carrier signal frequency from the set of possible carrier signal frequencies; and generating means for providing the set of possible carrier signal frequencies for use by the selection means, wherein the communication signal is adapted to be transmitted, at each transmission, at a newly selected carrier signal frequency.

The invention further provides for the arrangement to transmit the communication signal on more than one carrier signal frequency newly selected at each transmission.

The invention further provides that the arrangement selects the carrier signal frequency substantially independent of external influence and/or the selection of the carrier signal frequency being determined substantially internal of the device.

The invention also includes a remote device having the transmitter arrangement disclosed above.

The present invention also encompasses system(s) and method(s) of communicating with or identifying more than one remote device.

The present invention is predicated on the principle of providing or transmitting a communication or identification signal at at least one newly selected carrier frequency or medium at each communication or identification event. In the system, the interrogator is essentially "dumb" in that it does not require knowledge of the frequency used by one or more remote devices, nor does it require synchronism nor control of the frequency selected by each remote device.

The present invention has application to passive and/or active arrangements and/or devices. The transmission medium may be optical, capacitive, inductive electromagnetic, magnet, and/or acoustic. RF is preferred.

In one form, the invention utilizes substantially random or PN sequence selection of a carrier signal frequency from a defined set of possible carrier signal frequencies. The remote device in this case selects the carrier signal frequency, transmits data such as an identification code using that frequency and then reselects the same or a new carrier signal frequency for the next transmission event. In this embodiment, the interrogator has substantially no "knowledge about" nor "control of" the choice of carrier signal frequency made by the remote device for each transmission.

Further to this principle and the following description of an embodiment, there are enhancements that serve to improve the operational or system efficiency. For example, where passive devices are interrogated, a powering field established by the interrogator may be used as a timing reference for frequency synthesisers in either or both the remote device and the interrogator, allowing homodyne detection of the remote device's carrier in the interrogator.

In operation of the present invention, where the remote device utilises (say) six possible carrier signal frequencies from which to select a carrier signal frequency for transmission, the interrogator ideally has six receiver channels. Thus, if a transmission event occurs from a remote device on frequency no. 1, the interrogator via receiver channel no. 1 can decode and receive that transmission.

Where two or more remote devices transmit together, device no. 1 may transmit on channel no. 1, device no. 2 on channel no. 2 as selected by each device. The interrogator will in this case decode both device nos. 1 and 2 transmission.

Where device no. 1 selects channel no. 1 and device no. 2 also selects channel no. 1, the interrogator will receive a garbled transmission. The interrogator will ignore this transmission. The remote devices nos. 1 and 2 will then reselect new channels (carrier signal frequencies), preferably randomly and then retransmit, (say), on channels 1 (device 1) and 6 (device 2). The interrogator can then decode each transmission.

System efficiency can be improved by all remote devices substantially randomly reselecting a new carrier signal frequency at the same time instant. For this to occur, the interrogator may send a marking pulse for use as a control signal to trigger the timing of a carrier signal frequency selection or reselection. The timing signal does not control or convey knowledge of the frequency to be selected.

The signal(s) may be at a radio frequency or at any other frequency.

The random selection of carrier or modulation frequency(s) provides improved resistance to interference between labels. Co-interference of labels may be statistically ignored by the identifying receiver.

Each remote device may continue to transmit its device identification code while under the influence of the generator or while being powered.

Each device may include at least one transmission break during which its device identification code is not transmitted.

The device identification code receiver may comprise demodulation means adapted to identify each device.

The present invention also provides for the use of a passive coil label to extract energy from a surrounding applied field and the re-transmission by the passive label of a unique signal to be picked up by a receiver.

Reference herein to transponder(s) or label(s) should be read so as to include any other suitable and/or remote device or transmitter arrangement.

The present invention will now be described with reference to embodiments relating to the invention as embodied in a transponder and identification system using RF optical and/or acoustic frequency signals, without limiting the scope of the invention. In the accompanying drawings:

FIGS. 1A and 1B show an RF multiple identification system in accordance with the present invention. The remote device may be actively or passively powered.

FIG. 1D shows an optical embodiment.

FIGS. 2A, 2B, 3A, 3B and 4A, 4B show embodiments of a device suitable for use in the present invention.

The or each, transponder may be embodied in a single (IC) chip form. An external capacitor may be used to store the chip operating voltage. The receiver/transmitter inductive means, preferably a single coil, may also be mounted externally to the chip.

Figure 1:
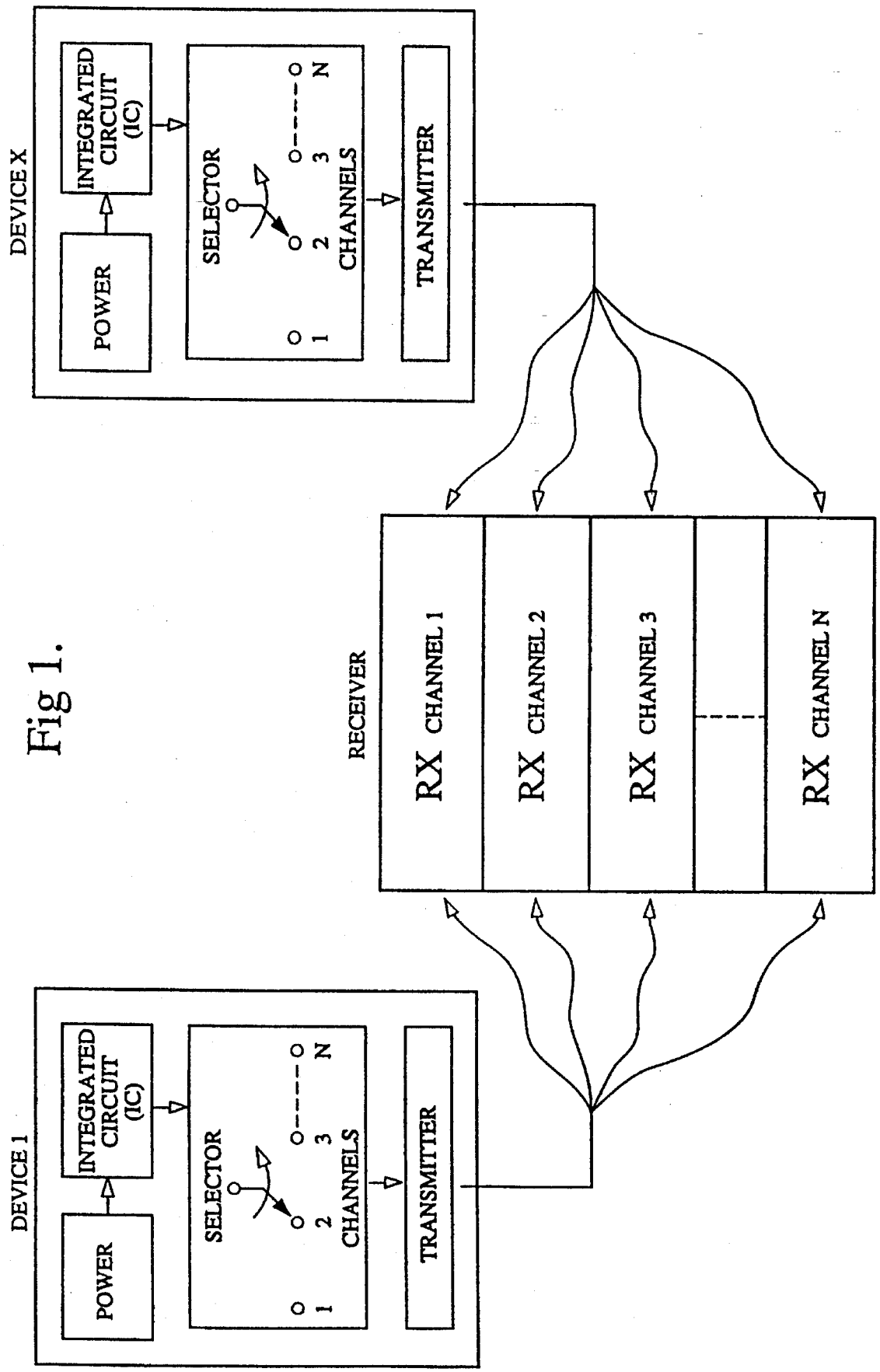
FIG. 1 shows an embodiment of the present invention.

FIG. 1 shows a basic embodiment of the present invention. A receiver may have a number of channels 1 to n adapted to receive signals from remote devices 1 to x. Where device 1 transmits a signal at a frequency on channel 1, it will be received by receiver channel 1, demodulated and decoded. Where device x transmits a signal at a frequency on channel 3, it will be received by receiver channel 3, demodulated and decoded. Frequencies are then reselected by each device for the next transmission.

Where both devices 1 and x transmit on, say, channel 2 together, the signal received by receiver channel 2 is garbled i.e. a mix of signals of devices 1 and x. This received signal is thus ignored by the receiver. Each device then reselects a new frequency for transmission, preferably randomly, although the selection may be pseudo-random. At this transmission, device may select channel n, and device 1 select channel 1, again. The signals can then be received, demodulated and decoded as required by each channel.

It is to be noted that the "frequency" or "channel" referred to may be of any frequency or medium, such as electrical, optical, magnetic, acoustic and RF is preferred.

Figure 1A:
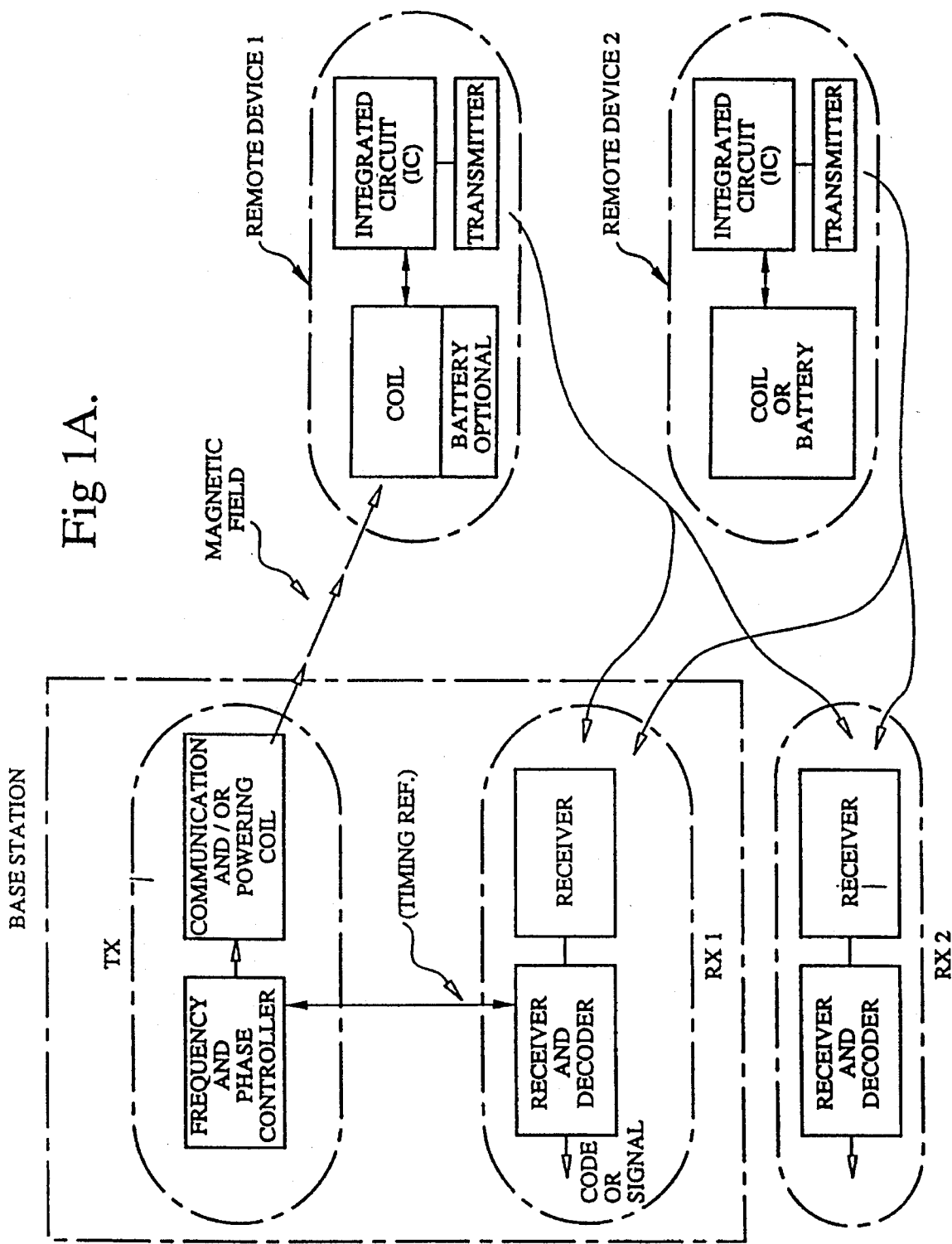

With reference to FIGS. 1A and 1B, the base station may include a transmitter for generating an ultrasonically oscillating magnetic field and may include means to radiate power to passive tags, if so required. The transponder(s) may contain a tuned pickup coil which may extract power and/or timing and/or other information from the magnetic field. Power is not required to be extracted where on-board battery supply is provided. The frequency, magnitude and phase of the magnetic field generated by the base station may be carefully controlled to enable the power picked up by the transponder coil to be adequate for most transponder orientations. A magnetic field radiated in two or three dimensions will aid power and information reception by the transponder(s). Identification codes and/or specially stored or other information may be transmitted from the transponder to a receiver in the base station, conventionally, by an RF or other suitable signal. Programming and/or interrogation of temporary or permanent memory on one or more transponder(s) may be performed conventionally, for example by modulation of the powering field. Concatenated coil(s) may be used to maintain field intensity in a predetermined space through which the transponder(s) will move. Magnetic field concentrator(s) may be used to amplify field intensity.

Furthermore, the transponder(s) may generate one or more carrier frequencies from an available set of carrier frequencies. These carrier frequencies are preferred not to be harmonically related to the frequency of the powering magnetic field. By allowing each transponder to use any one of a multiplicity of available carrier frequencies, many transponders simultaneously transmitting to the base station may be identified under conditions where co-interference would normally preclude correct identification. Ensuring correct identification may be enhanced by reducing the possibility of more than one transponder simultaneously transmitting at the same frequency. An idle state, during which a transponder does not transmit, may aid correct identification. The number of carrier frequencies and idle states may be contingent upon the particular application. The correct identification of a transponder may be reliant upon the transponders having a carrier frequency or mix of carrier frequencies, free of interference by other transponders, to transmit on. The particular mix of carrier frequencies, idle states and probability weightings may be chosen to maximise the probability of any one transponder having a free channel to transmit, to a receiver, its identification code word. Inclusion of redundant frequency channels may guard against the possibility of chance transponder interference. Signals which may have been corrupted or co-interfered with may be ignored by the receiver, and may thereby enable the system to operate within a predetermined failure rate criterion. Corrupted or co-interfered signals may be determined on a statistical basis or by means of an error detecting code. The transponder(s) may transmit the identifying code at a randomly selected frequency(s), selected from a set of available carrier frequencies, and, once transmission is completed, again re-transmit the code at the same or another frequency(s) selected from the carrier frequency set. The identifying code may be used to modulate the selected frequency(s).

The system of transponder identification according to the present invention may allow for identification of a number of objects by a uniquely coded transmission from a passive transponder or label attached to each object, identification occurring at substantially the same time.

Figure 1C:
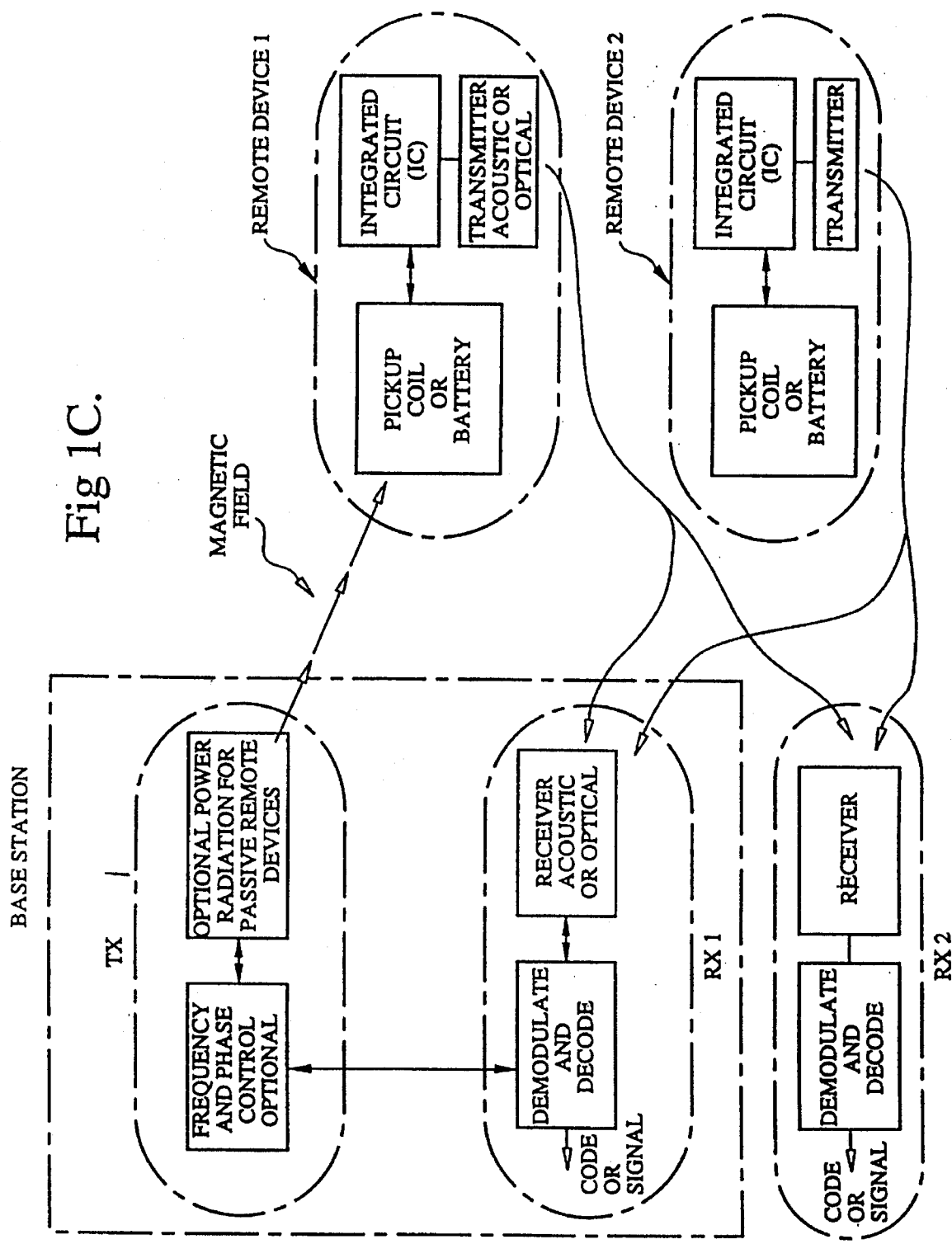
FIG. 1C illustrates an acoustic, capacitive, inductive, electromagnetic or optical based system.
Figure 2A:
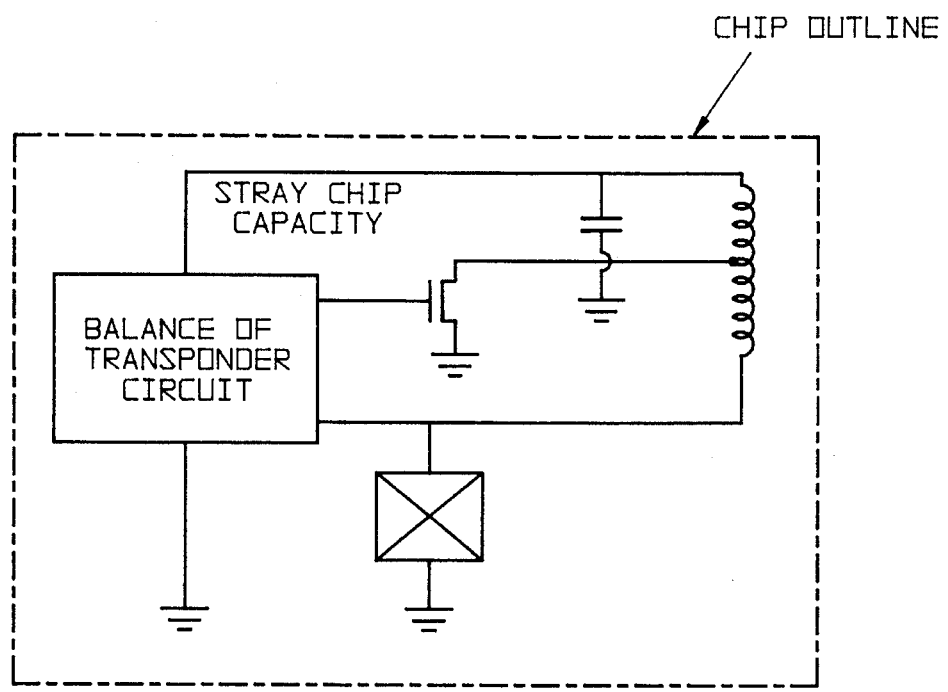
Figure 2B:
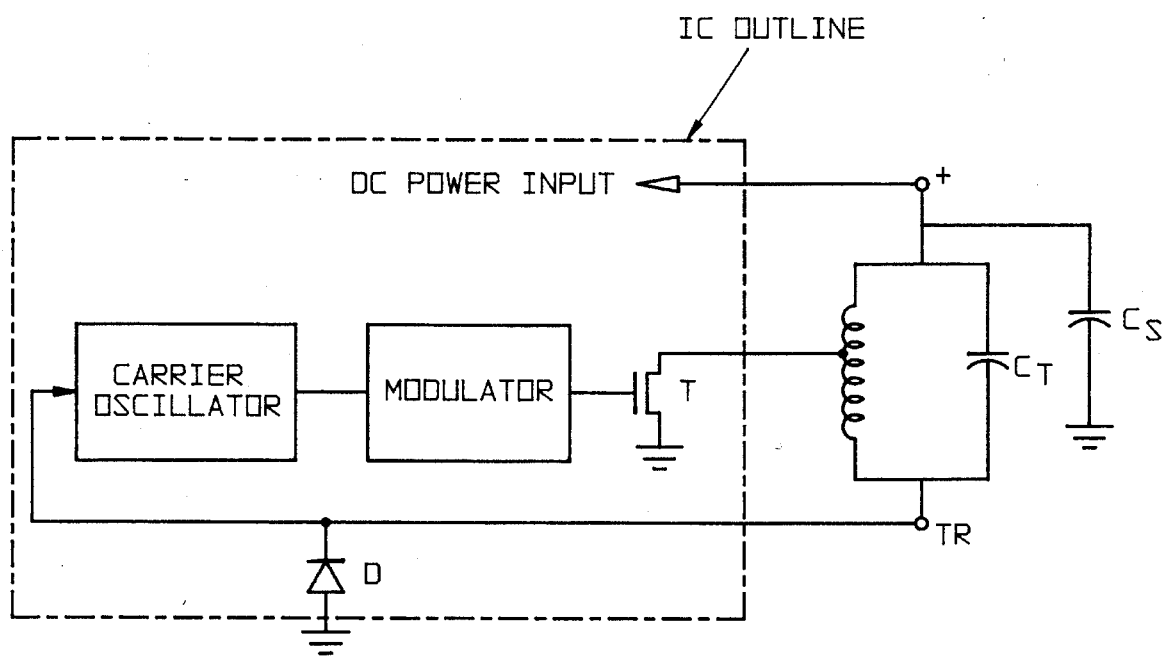
Figure 4A:
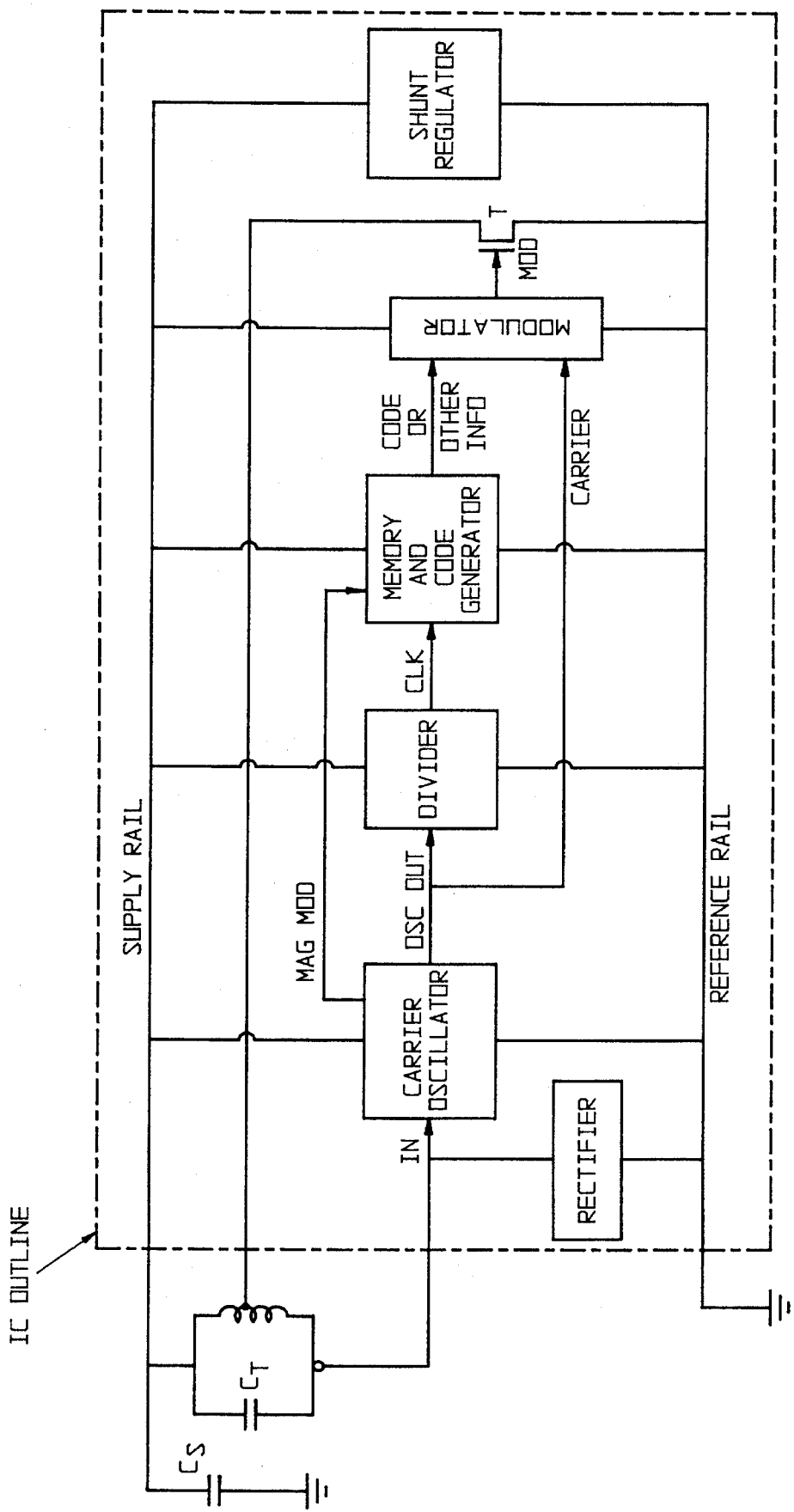
Figure 4B:
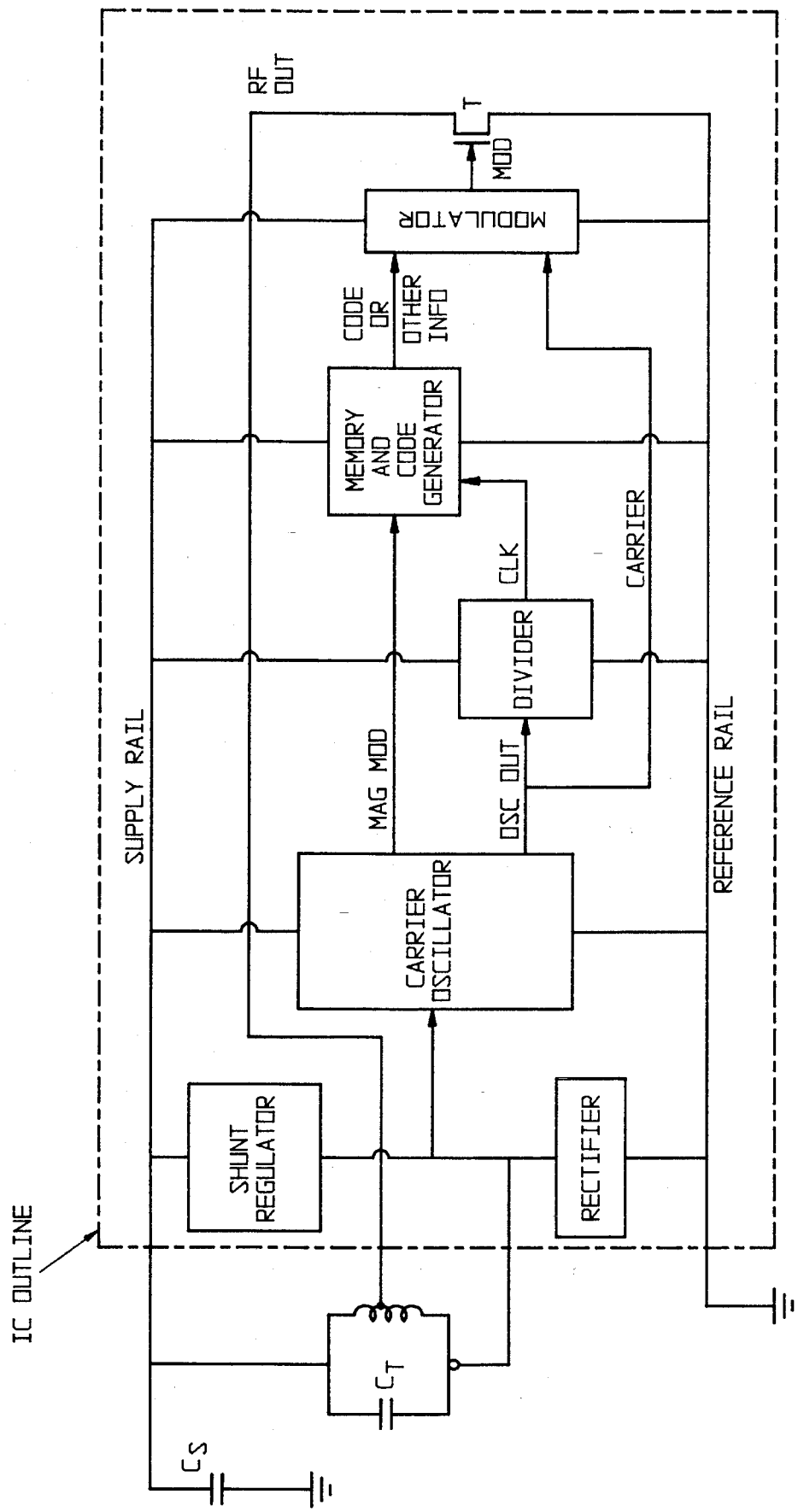

FIG. 1C shows another embodiment, but applicable to acoustic, capacitive and/or optical transmitter systems. The embodiment is similar to that of FIG. 1, but the systems uses optical and/or acoustic transmission. In an acoustic embodiment, transmission may be effected by the selection of a new frequency in the acoustic band of frequencies at each transmission.

In the case of capacitive systems, the transmitter of each remote unit and the receiver(s) of the base station are capacitive plates. Proximity of the plates provides communication.

FIG. 1D further shows an optical based system, where transmitters Tx1 and Tx2 use selection of colours (optical) as a means of communication. The colours shown may, for example, be LEDs.

In the optical communication and/or identification, it is contemplated to use one or a combination of:

i) selection of a colour equivalent to the selection of a radio channel. A signal or code may be sent on that selected colour. The colours may be modulated, pulsed or switched as appropriate.

ii) selection of colour in a "pattern" forming a means of transmission. The receiver determines Tx1 or Tx2 via the "pattern" of colour received. For example R B G R B may be tag 1 and B R B R B R may be tag 2. The receiver may determine the appropriate tag or sequence by reading received power (optical) levels. Correlation techniques may be used to determine the power level received and thus by reference to a map or store of transmitter number and "pattern", each particular transmitter may be identified or communicated with.

iii) using correlation techniques, the methods of i) and ii) above may be superimposed with a correlation sequence. Alternatively, a signal colour or optical wave length can be used by all tags, and each receiver being adapted to receive a particular correlation sequence. Each tag could then transmit its correlation sequence and be identified simultaneously by respective receivers.

With reference to FIGS. 2A, 2B, 3A, 3B, 4A and 4B, power, preferably in the form of a magnetic field, may be transmitted inductively or radiated to the transponder. Each transponder may include one or more pickup or receiver transmitter coils or inductive means. To minimise detailing, further reference herein is made to only single coiled transponder(s). A pickup coil, preferably tuned, may be situated in the transponder to collect or receive the power. After rectification, the power may be utilised by an integrated circuit (IC) within the transponder. The frequency of the powering signal may be used as a universal frequency reference for both the IC and the base station (FIG. 1A). Alternatively, an oscillator in, the base station may serve as a universal timing reference for the powering signal, base station receiver and transponder IC (FIG. 1B). The transponder IC derives its frequency reference from the powering signal (FIGS. 2A, 2B, 3A, 3B, 4A and 4B). Each transponder may be controlled and/or programmed by modulating the inductive powering field. This modulation may enable data or commands to be transmitted to one or more transponder(s). This modulation may be used, for example, to program data into the transponder, set bit(s) in the transponder which may control the transponder's function e.g. a bit to disable transmission permanently when the transponder is discarded, or control the transponder's activity while it is being inductively interrogated e.g. forcing a change in the transponder's carrier frequency, or generally controlling and/or interrogating other transponder units or functions.

To ensure that the transmission of power and/or signal(s) is as uniform as possible, a two, or if necessary, a three dimensional antenna system may be used. An antenna structure at the base station may receive the transponder's coded carrier transmission. With regard to the IC of a transponder, it may generate one or more non-harmonically related carrier signals from the frequency of the powering field. The method of generating these carrier signals will be explained further on.

The carrier signals generated by the IC are phase locked to the powering signal. The powering signal is derived from a master oscillator in the base station. Coherent locking of the carrier signals allows direct coherent demodulation of the coded carrier signal by the receiver and demodulator in the base station. Coherent detection is the optimum detection scheme for coded carrier signals. The frequency of the powering field or a carrier signal divided down may be utilised as a clocking signal for the IC. A unique code, preset, programmed or selected in the IC may be used to modulate the carrier signal at a rate determined by the clocking signal. The modulator may produce a modulated RF signal using, typically, phase modulation, amplitude, pulse width, pulse position or other modulation. This code modulated signal may be injected into the transponder pickup coil for inductive transmission to a receiving antenna structure.

Figure 9:
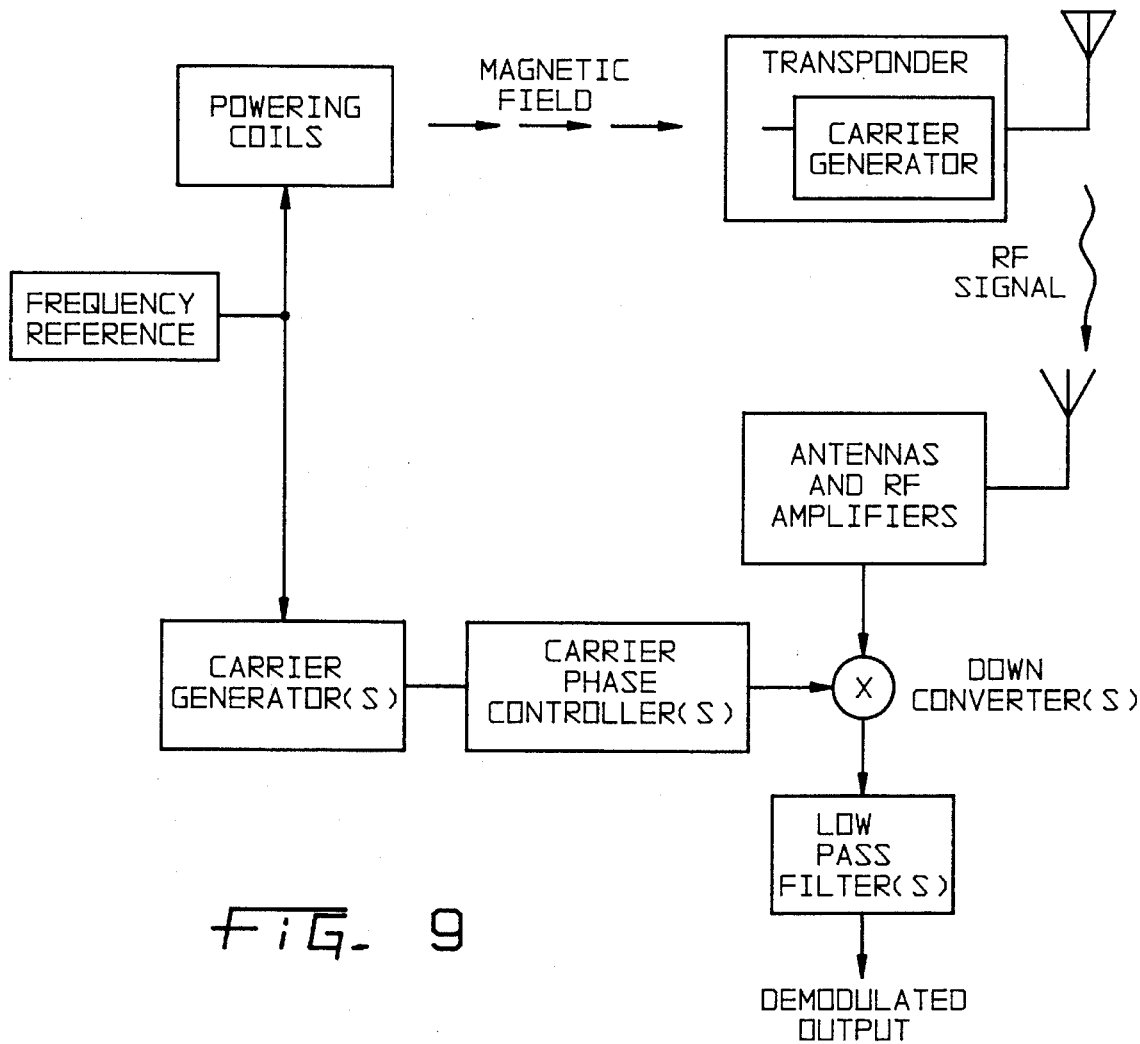
FIG. 9 shows a schematic of a coherent receiver.

The signal(s) received from one or more transponder(s) may be amplified and coherently detected, using a local oscillator locked on to the powering field's frequency or preferably the base stations master time reference oscillator. A multiplicity of coherent detection schemes may be used to detect the received signal(s), all of which are known to those skilled in the art of communication. For example, direct homodyne detection of a transponder carrier may be possible using a local oscillator locked to the transmitted powering field's frequency (FIG. 9). The power field's frequency may be used as a universal timing reference. For a preferred modulation scheme (phase modulation), optimum detection may be realised using correlators locked to the powering field's frequency. Either a frequency agile receiver or a multiplicity of receivers may be tuned to the different possible carrier frequencies contained within the set of carrier frequencies to receive the transmitted signal from the transponder(s).

For those applications where the orientation of the transponder may be random, such as baggage and livestock identification, special antenna structures may be necessary such that the voltage picked up by the transponder(s) coil, which may be dependent upon the cosine of the angle between the transponder coil axis and the direction of the magnetic field, is preferably substantially constant over a large volume of space, and so that rapidly moving transponders may be satisfactorily identified. Ideally, the power transferred to each transponder coil should be independent of transponder orientation.

To provide an isotropic powering field three sets of coils may be orientated along the X,Y and Z axes. The phase and frequency used to drive these coils may be carefully controlled to generate an isotropic powering field and provide a uniform field over a substantial volume of space. Two coils may alternatively be used.

The data transmitted from the transponder may be received by loop antennae set up in two or three dimensions or axes. The data signals from each axis may be detecting separately and may be combined for decoding or decoded separately.

Interference may be cancelled by mounting a set of "interference coils" in proximity of the transponder(s) data or signal receiving coils. The signal from the interference coil may be subtracted from the receiver signal cancelling any interference. Cancellation may be done at the carrier's frequency.

By having one or more transponder(s) select, preferably randomly, from a plurality of possible transmission frequencies, and/or by utilising one or more transmission break(s), during which no transmission from at least one transponder is made, or a combination of these, the simultaneous identification of a plurality of transponders may be possible. Each transponder in the system of the present invention, when powered, may begin to transmit its code or other information. This transmission may be continuous while the transponder is powered. The transmission may be based on a preferably randomly selected frequency(s), from a possible set of frequencies, or transmission breaks.

A method, of identification for use in a system as described hereinbefore, the system being adapted for any system designed to identify transponder(s) or labels, may include an acceptable failure rate criterion. The correct identification of each transponder may require that ,each transponder has at least one complete code or data word transmission free of interference from other transponder(s).

For a transponder to be correctly identified it only requires one good read during an interrogation cycle. Alternatively, for the transponder to not be identified requires that all reads are bad, i.e. P (at least one good read)=1–P (all reads are bad).

Probability that a read is good requires that no other transponder is using the same carrier frequency, if there are "m" transponders and "n" channels and each transponder's transmissions are independent of all other than this probability is:

$$\left(\frac{n-1}{n}\right)^{2(m-1)}$$

hence the probability that a transmission is bad is:

$$1-\left(\frac{n-1}{n}\right)^{2(m-1)}$$

and the probability that of k code transmissions all are bad is $$\left(1-\left(\frac{n-1}{n}\right)^{2(m-1)}\right)^k$$

this is the probability that a particular transponder will fail to be identified during an interrogation cycle.

By carefully choosing the number of carrier frequencies available to a transponder and/or the availability of a transmission break, the system's failure rate may be matched to the acceptable failure rate.

Figure 5:
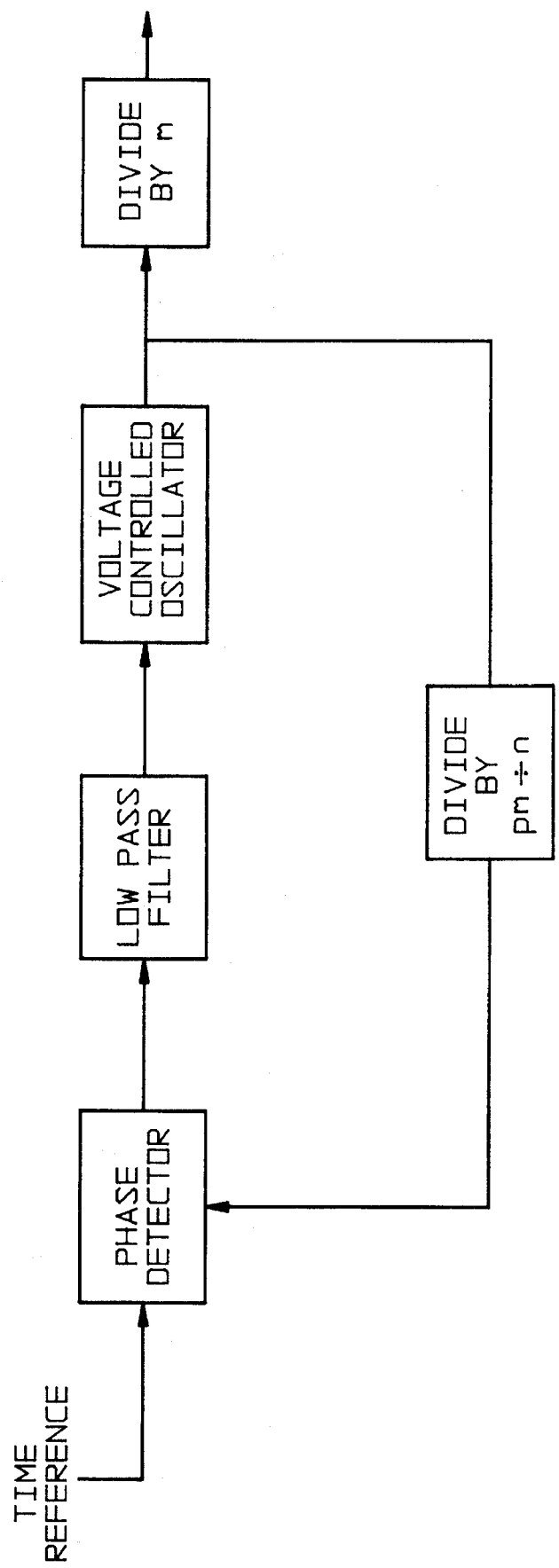
FIG. 5 shows a circuit for generating the remote device carrier signal.
Figure 6:
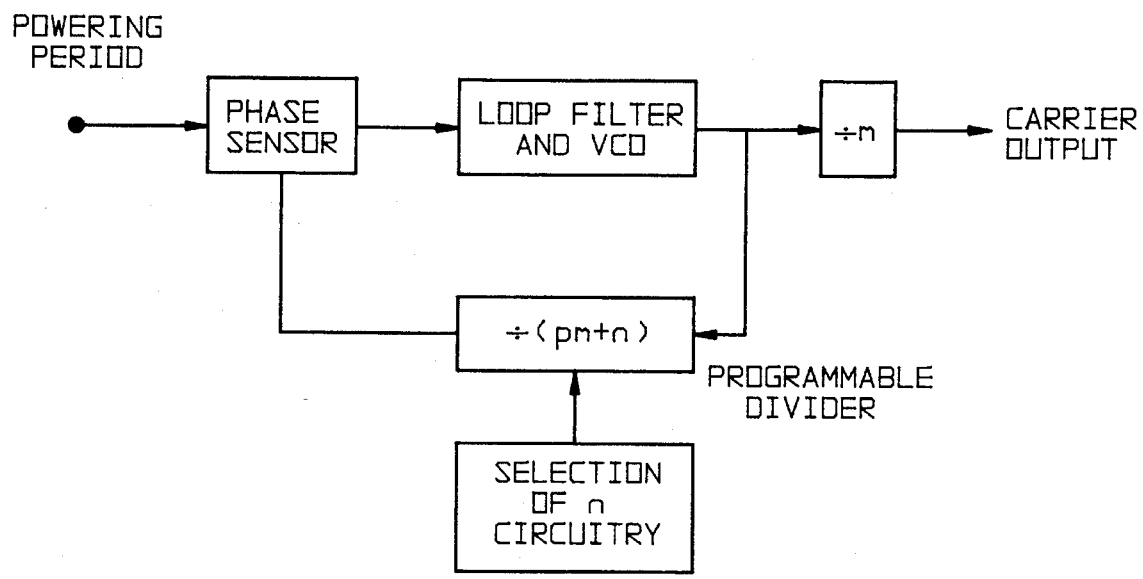
FIGS. 6 and 7 show alternative Embodiments capable of generating a plurality of carrier frequencies. The embodiments shown are generally applicable to RF and/or acoustic systems.

A carrier generator in each transponder or label may generate carrier frequency(s) for use by the modulation means. The carrier frequency(s) may be generated by one or more voltage controlled oscillators (VCO's), as shown in FIG. 6, which may be phase locked to the frequency of the inductive powering field. The output carder frequency may equal $$\left(p + \frac{n}{m}\right) \times \text{(frequency of inductive power field)};$$

where p is a harmonic of the powering field's frequency and the ratio n/m is not an integer FIGS. 5 and 6). A circuit for generating the carrier frequency is shown in FIG. 5. The circuit is a phase locked loop (PLL) incorporating a frequency divider in the feedback loop. This type of circuit is well known and acts as a frequency multiplier with the output frequency of the VCO (or other similar controlled oscillator) equal to the divider magnitude:

frequency VCO=(pm+n)×frequency time reference.

The VCO output frequency will always be a harmonic of the powering field and potentially would be prone to interference from the field's harmonics. Dividing the VCO output by "m" changes the output frequency such that only every $m^{th}$ carrier frequency coincides with a power field harmonic. In the preferred embodiment these frequencies are not utilised by the transponder. Consequently, the powering field's harmonics may never interfere with the carrier transmissions.

A further advantage of this method of phase coherent carder generation is that a similarly generated local oscillator signal at the base station can be used to coherently detect and demodulate the carrier signal(s). This oscillator can be phase locked to the powering field (like the transponder carrier oscillator) or in its preferred form to a master time reference oscillator from which the power field's frequency is derived. Direct homodyne detection of the carrier can be done using identical frequency generating parameters n, m and p as used by the transponder carrier oscillator. Alternatively the carrier signal can be converted to an intermediate frequency (IF) before detection. These coherent detection principles are widely utilised and well understood.

Figure 7:
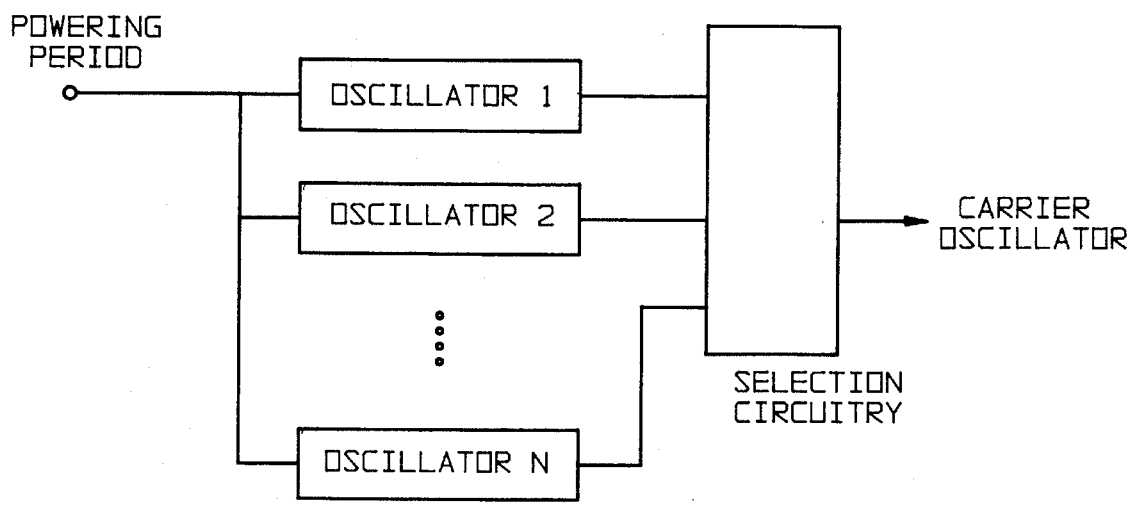
Figure 8A:
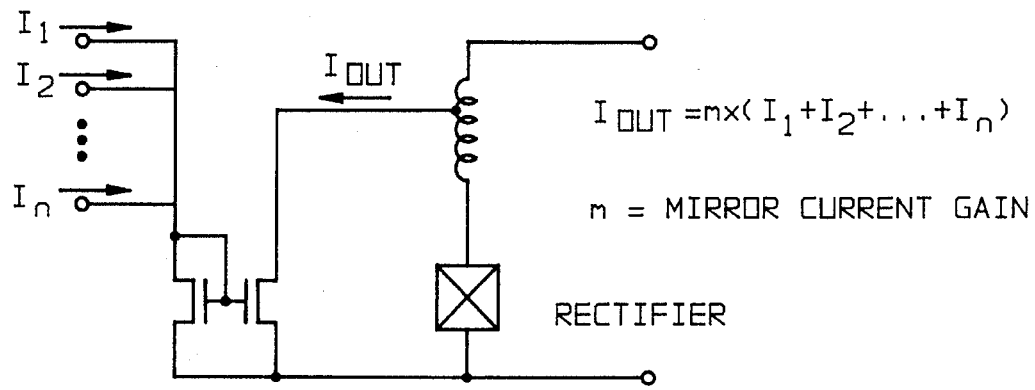
FIGS. 8A and 8B show two circuits for transmitting two or more modulated carder signals simultaneously and independently of each other.
Figure 8B:
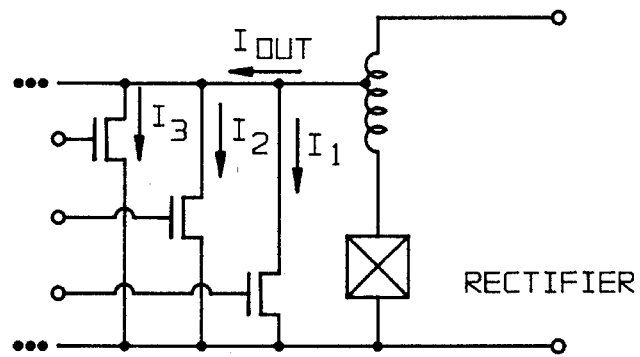
Figure 10A:
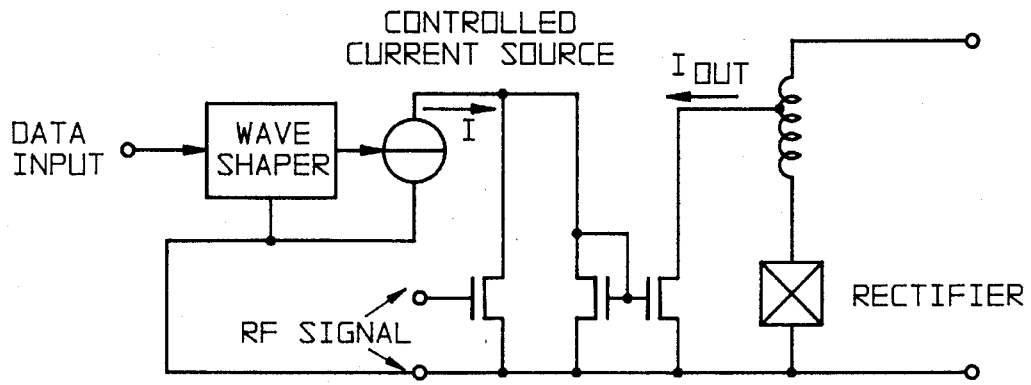
FIGS. 10A and 10B show two circuits for envelope shaping the modulated carrier signal to reduce sideband interference between channels.
Figure 10B:
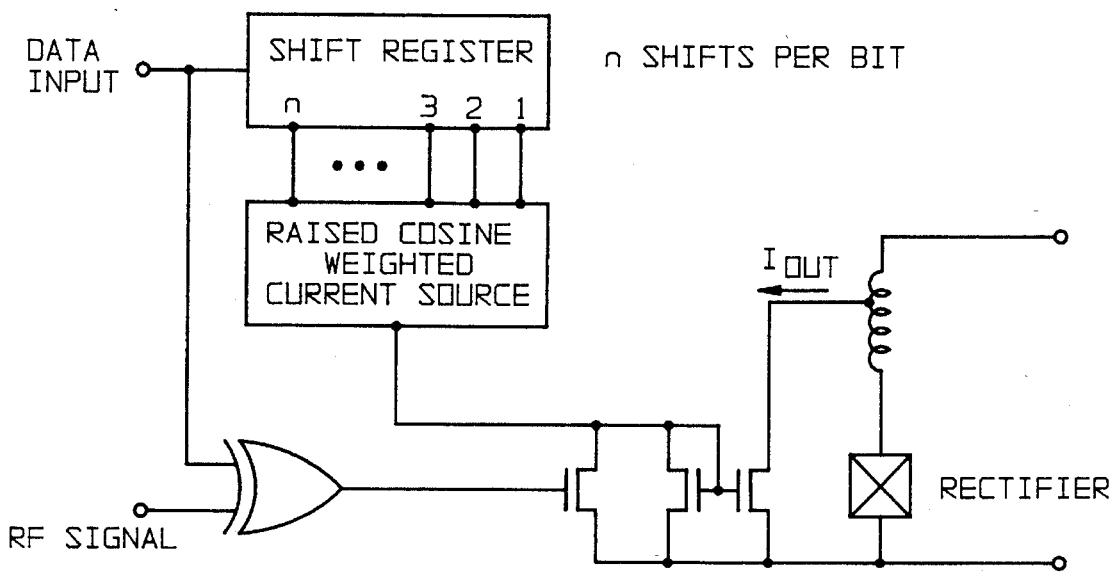

FIG. 7 shows an alternative carrier frequency generator where a number of oscillators, each of a different frequency, are provided. An oscillator(s) can be selected for each transmission internal of each remote device. This embodiment is applicable to all frequencies useful with the present invention, including RF, acoustic and optical frequencies.

The present invention may provide a system in which control of the selection of a carrier frequency(s) and/or transmission break(s) may be accomplished. Varying degrees of complexity may be implemented by the selection circuitry. In one embodiment, a pulse of modulation, on the powering field, may cause any affected transponders to randomly select a carrier frequency or transmission break. By appropriate coding of this modulation of the powering field, coupled with suitable detection and decoding circuitry on each transponder, more elaborate selection schemes such as, turning off a particular transponder's transmission, forcing some or all transponders off a channel(s), or changing a particular transponder's channel may be implemented. Frequency, phase, amplitude or pulse modulation or any combination of these can be used to modulate the magnetic powering field.

For an arbitrarily modulated oscillating magnetic field, the data rate may be limited by the bandwidth of the transponder's antenna. This may be sufficiently large to allow a data rate of any required number of kilobits per second.

Figure 11:
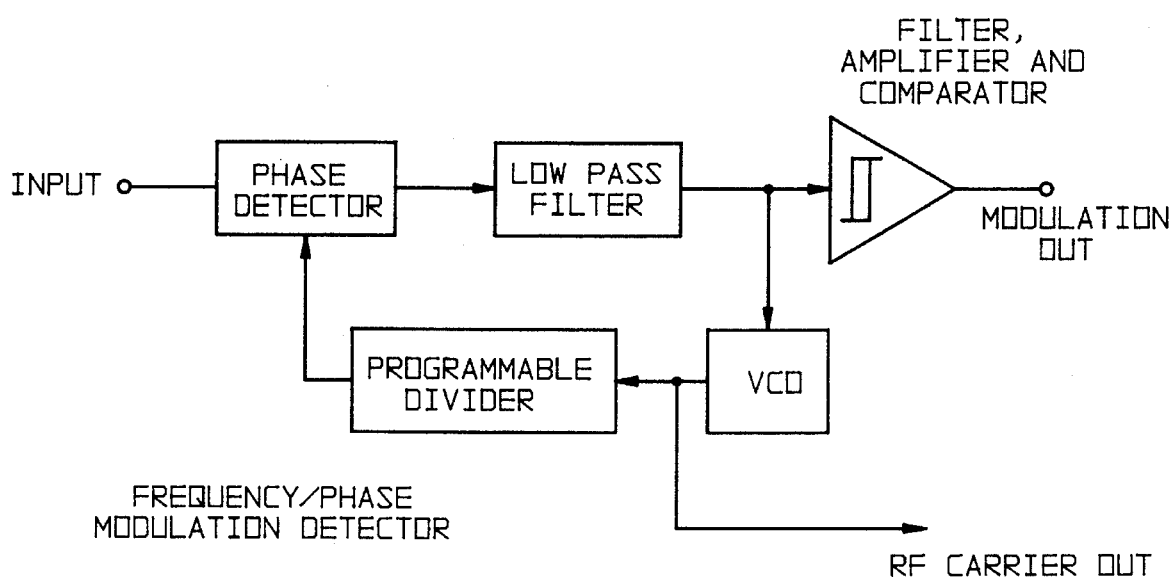
FIGS. 11 and 12 show modulation detection circuits, useful in the receiver(s) and/or tag(s).
Figure 12:
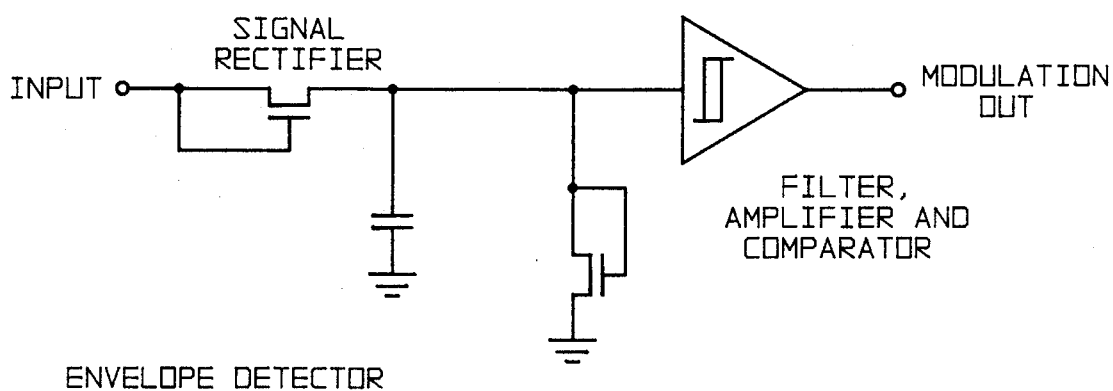

Preferably, the magnetic field may be phase or frequency modulated because these may not appreciably affect the power transmission from the base to the remote device. Amplitude, pulse width or pulse position modulation may also be used. FIGS. 11 and 12 show circuits for detecting this modulation.

The simultaneous action of power transfer and data or command transmission by a magnetic field may allow the remote control of electro-mechanical devices and/or electronic circuits and the remote programming of $E^2$ PROM or conventional CMOS memory with battery backup in a manner similar to that as detailed herein.

Arbitrary probability weightings of selection may also be assigned to each carrier frequency and/or idle state. Alternatively, a transponder may randomly select either a transmission break or carrier frequency. The carrier frequency of the transponder may be altered after each completed code or data word transmission or the transmission of more than one code or data word before reselecting the carrier frequency.

The system may also provide for the simultaneous transmission of more than one carrier frequency by any transponder. Transmission of more than one carrier can be used to increase the communication reliability or to increase the rate of data transmission. Different sets of data or unique signals can be transmitted on different carrier frequencies. A transponder may select a subset of carrier frequencies from the full set of available carrier frequencies. The exact number of carriers transmitted, the size of the full set of carrier frequencies and the method of selection i.e. whether controlled or by random internal selection, would depend upon the particular transponder's application.

It has been shown mathematically, that in a system of "m" labels, each randomly choosing one out of "n" distinct radio channels before each transmission, if a total of "k" transmissions are possible (by any one label) within the available time, the probability of one or more labels failing to be identified, is given by $$\left(1 - \left(\frac{n-1}{n}\right)^{2(m-1)}\right)^k$$

The use of certain, inherently random, natural processes (to generate the random numbers used here to select the transmitting channel), is well known. Examples used in practical equipments include radioactive decay processes, and the so-called "shot noise" generated by quantum mechanical processes within semiconductor diodes.

These processes are, however, somewhat awkward to implement on a semiconductor, VLSI, "chip". The noise-diode approach, in particular, suffers from the risk that the "noise" signal (which is at a low amplitude) will be contaminated by other, stronger electrical signals present on the chip. This could seriously impair the statistical properties of such a signal.

The use of a "Pseudo-Random Binary Sequence" (PRBS) generator, in digital systems, is well known. The device typically comprises a digital shift register (built using any known method), associated with a computing means (typically an arrangement of logical gate circuits), which generates a binary, logical function of the shift register's contents. This value is applied to the serial input of the shift register. As the shift register is clocked, a new binary number appears in the several "bits" of the register.

With a careful choice of register length, and of the mathematical function generated by the said computing means (the "feedback function"), it is possible to generate a sequence having as many as $2^N - 1$ distinct values (a so-called maximal-length, or "M-" sequence) using a N-bit shift register. Such a sequence can exhibit mathematical properties closely approximating a true, random sequence.

On the face of it, such a device is inherently unsuitable for the present purpose. The reason is that, when the label is first excited by the powering magnetic field, there is no means to determine what will be the initial contents of said shift register. In practice, the initial value will almost always be a constant value, identical for every label. (The value will be a function of the physical circuit layout on the VLSI chip. This, of course, is the same for every label).

In such a case, every label being initially started at the same number, the feedback function will reproduce identically in every label, and they will continually transmit on the same channel. This defeats the purpose of the system.

A simple modification permits the use of a PRBS generator (so gaining its acknowledged advantages of inherent suitability for VLSI implementation), but avoids the problem aforementioned.

Recall that the labels contain, inter alia, a "memory means" to record their identification codes. Let this memory means be expanded sufficiently to store, besides said identification code, a further number, having as many bits as has the PRBS shift register. Let the control circuitry in the label be so adapted that, whenever the label is first excited by the powering field (i.e. its logic circuitry "starts up"), this additional number is loaded into said PRBS register. This number being loaded, the PRBS generator operates as described.

Let further, the associated programming means (the equipment which initially stores the identification code in said memory means) be further adapted to store also, a randomly generated number (another PRBS circuit would suffice here) in the additional memory space aforementioned.

With a total of "N" binary bits in the PRBS register, we have now a 1 in $2^N-1$ chance that two labels will start up at the same point in their PRBS sequences. In that event, the system will fail, since these two will always "track" each other. With a target value for system reliability determined, this rule fixes a minimum length for the PRBS generator. Commonly, the PRBS register will be given a length equal to the next prime number, larger than the size found above.

The PRBS system is particularly effective, if both the number of bits, N, in the register, and the number of PRBS states, $2^N-1$, are both prime. In this case, however many times the register is shifted between channel selections, all possible states will be exhausted before the cycle repeats. An example of such a PRBS circuit comprises a 17-bit register, with the feedback function comprising 49 an exclusive-OR of the 14th and 17th bits. The numbers 17 and 131071 are both prime.

It is desirable that the register should be shifted, between channel selections, a number of places greater than its own length. This ensures that the "randomising" process has been applied to every bit in the register. Any desired subset of the register bits may be used to effect the channel selection.

We claim:

1. A transmitting arrangement adapted to provide communication and/or identification, said arrangement comprising:

transmitter means adapted to transmit a communication signal via a carrier signal having a frequency selected from a set of possible carrier signal frequencies;

selection means for selecting the carrier signal frequency from the set of possible carrier signal frequencies; and generating means for providing the set of possible carrier signal frequencies for use by the selection means; wherein the communication signal is transmitted, at each transmission, at a newly selected carrier signal frequency.

2. An arrangement as claimed in claim 1, wherein selection of the carrier signal frequency from the set of possible carrier signal frequencies is random.

3. An arrangement as claimed in claim 1, wherein the transmitter means is adapted to go to an idle state in order to provide a break in transmission for a predetermined period of time.

4. An arrangement as claimed in claim 1, wherein each carrier signal generated is assigned a probability weighting in accordance with a desired use of each carrier signal at each transmission.

5. An arrangement as claimed in claim 1, where a plurality of carrier signal frequencies is selected for use at transmission.

6. An arrangement as claimed in claim 1, wherein the communication signal is a unique signal identifiable with the arrangement.

7. An arrangement as claimed in claim 1, wherein each signal is transmitted at selected carrier frequencies sequentially or cyclically.

8. An arrangement as claimed in claim 1, wherein the communication signal is transmitted, at each transmission, at a set of newly selected carrier signal frequencies and is transmitted at different selected carrier frequencies, simultaneously.

9. An arrangement as claimed in claim 1, wherein the frequency generating means includes a memory means for storing possible carrier signal frequencies.

10. An arrangement as claimed in claim 1, wherein selection or reselection of a carrier frequency is performed in accordance with a predetermined probability weighting.

11. An arrangement as claimed in claim 1, wherein the control means uses a pseudo-random binary sequence (PRBS) logic circuit to randomly select or reselect said selected frequency.

12. An arrangement as claimed in claim 11, wherein the PRBS is adapted to have an initial value loaded therein when the transmitting arrangement is first powered, the value being stored in a memory in the transmitting arrangement.

13. An arrangement as claimed in claim 12, wherein the signal and value are arbitrarily assigned to the transmitting arrangement before use of the transmitting arrangement.

14. An arrangement as claimed in claim 1, wherein upon receipt of an external timing signal, the selection means selects or reselects at least a new one of the carrier signals for transmission.

15. An arrangement as claimed in claim 1, wherein frequency of the set of possible carrier signals is programmed in the transponder from an external source.

16. An arrangement as claimed in claim 1, wherein the selection means acts to select the carrier signal frequency without external influence.

17. An arrangement as claimed in claim 1, wherein the selection means determines internally the selection of the carrier signal frequency.

18. An arrangement as claimed in claim 1, where the carrier signal and/or communication signal medium is optical, electrical, magnetic or acoustic.

19. An arrangement as claimed in claim 1 in which the arrangement is incorporated in a device.

20. An arrangement as claimed in claim 19 in which the arrangement is incorporated in a device, the device being passively powered.

21. An arrangement as claimed in claim 19 in which the arrangement is incorporated in a device, the device being actively powered.

22. A system adapted to provide communication and/or identification, the system comprising:

at least two remote transmitter arrangements, each arrangement comprising transmitter means adapted to transmit a communication signal via a carrier signal having a frequency selected from a set of possible carrier signal frequencies;

selection means for selecting the carrier signal frequency;

frequency generating means for providing the set of possible carrier signal frequencies for use by the transmitter means; where the communication signal is transmitted, at each transmission, at a newly selected carrier signal frequency; and system receiver means including at least two receiver channels, each channel being adapted to demodulate a corresponding communication signal sent by a transmitter arrangement at a corresponding carrier signal frequency.

23. A system as claimed in claim 21, wherein the number of receiver channels is the same as the number of possible carrier signal frequencies.

24. A system as claimed in claim 22, wherein the receiver means further includes logic means for ignoring information signals having the same newly selected frequency.

25. A system as claimed in claim 22, adapted to communicate with at least two transmitter arrangements simultaneously.

26. A system as claimed in claim 22, wherein the receiver means is synchronised to the frequency of an electromagnetic field to facilitate demodulation of each communication signal.

27. A method of communication between an interrogator and at least one remote device, said method comprising the steps of:

each remote device generating a first signal for transmission via a carrier signal at a frequency selected by each respective remote device from a respective predetermined set of carrier signal frequencies, the frequency of the carrier signal being determined by each remote device;

transmitting said first signal from each remote device to the interrogator; and generating and transmitting the first signal successively or repetitively at each transmission via a new carrier signal.

28. A method as claimed in claim 27, wherein each remote device transmits the first signal to the interrogator simultaneously.

29. A method as claimed in claim 27, wherein the selection of carrier signal by each remote device is random or pseudo-random.

30. An arrangement as claimed in claim 18 in which the arrangement is incorporated in a device.

31. A method as claimed in claim 28, wherein the selection of carrier signal by each remote device is random or pseudo-random.

32. The arrangement of claim 1 wherein the communication signal is transmitted, at each transmission, at a set of newly selected carrier signal frequencies.

33. The arrangement of claim 1 wherein the transmitter means is adapted to transmit on a redundant channel in order to provide a break in transmission for a predetermined period of time.

34. The arrangement of claim 22 wherein the communication signal is transmitted, at each transmission, at a set of newly selected carrier signal frequencies.

\* \* \* \* \*